Patented Jan. 15, 1946

2,393,173

UNITED STATES PATENT OFFICE 2,393,173

PROCESS OF COMPACTING OR SEALING FORMATIONS

Delmar H. Larsen, Los Angeles, Calif., assignor to National Lead Company, Los Angeles, Calif., a corporation of New Jersey No Drawing. Application May 7, 1942, Serial No. 442,083

6 Claims. (Cl. 166—22)

This invention relates to the compacting or sealing of formations, and more particularly the formations encountered in the drilling of deep wells, such as oil or gas wells.

In the drilling of deep wells, particularly oil or gas wells, it is necessary to seal off or shut off formations, such as water bearing sands. This is usually accomplished by setting a casing and forcing cement slurry down the casing and up outside thereof, the cement then being allowed to set. While such cementing of casing is almost universally practiced, it is neither certain nor entirely satisfactory, because of the liability of channeling and premature setting of the cement. In practice, therefore, many cement jobs have to be recemented at great expense.

One of the objects of this invention, therefore, is to provide a process of compacting or sealing formations, which is simple in its application, economical and also efficient in the final result.

Further objects will appear from the detailed description in which will be described a number of embodiments; it is to be understood, however, that this invention is susceptible of various embodiments.

Generally stated, and in accordance with an illustrative embodiment of this invention, there is introduced into the formation a suspension of a comminuted material which is of a particle size and character as to be non-colloidal, non-gelling, non-swelling, capable of deflocculation when in a suspension and capable of ready sedimentation when the suspension is at rest. In order to facilitate introduction, and finally to secure sedimentation in such a manner as to obtain the most efficient seal, the suspension is deflocculated by introducing with a suspension of comminuted material a deflocculating agent therefor. After introduction of the deflocculated suspension the same is allowed to remain at rest; this permits the comminuted material having the described characteristics to settle and form a most efficient seal.

The invention is susceptible of various applications, one of which is the sealing of a casing in a well bore. To secure this the deflocculated suspension of the comminuted materials is introduced into the well and around the casing, followed by permitting sedimentation of the material around the casing. One way to secure such sealing of a casing is simply to introduce the suspension into the casing set off from the bottom of the well; for the suspension will rise upwardly around the casing. However, the suspension can be introduced in accordance with either the one plug or the two plug method employed in the cementation of casing with a cement slurry and with the employment of such other accessories as are usually employed in the sealing of formations.

The invention is capable of employment for the closing or "killing" of a well, which is to be abandoned. In such a case the suspension is introduced into the well and simply permitted to settle. Where high pressures are encountered, the suspension can be one of a weighting material in water with a deflocculating agent. The invention is also applicable for compacting and sealing of formations generally, and for the fixing or anchoring of members generally, such as caissons, piers, posts, etc. In such a case the introduction of a deflocculated suspension around the member, followed by settling of the material, will firmly anchor the member.

The comminuted material may be any suitable one, as hereinafter described; however, the particle size and the character of the material is such as to be non-colloidal, non-gelling, non-swelling, capable of deflocculation when in a suspension and capable of ready sedimentation when the suspension is at rest. Any inert finely ground or comminuted material may be employed, such as barytes, iron oxide, strontium sulphate, ground silica, ground limestone, and the like. Materials of high specific gravity are particularly useful where high pressures are encountered. The grinding is preferably such as to secure particle sizes from 200 mesh (per linear inch) down to sizes produced by such grinding of such material.

The deflocculating agent may be any suitable one adaptable to the material and the liquid medium. Thus, for the materials mentioned, one of the polyphosphates, such as sodium hexametaphosphate and tetra sodium pyrophosphate are suitable. Other phosphates, such as disodium-dihydrogen-pyrophosphate, sodium triphosphate and sodium tetraphosphate are also useful, as is also sodium pyrovanadate. Moreover, tannins, such as quebracho and chestnut extract, particularly as alkaline tannates, are also useful, as is also sodium metasilicate. The percentage of a deflocculating agent required is small; thus to secure a deflocculated suspension of barytes, 0.3% of sodium hexametaphosphate or one of the other polyphosphates, calculated on the barytes, is sufficient.

The effect of a deflocculating agent, securing a deflocculated suspension of a material, is to greatly improve the compacting and sealing qualities and effects. This is illustrated by the following example: A 20% (by weight) suspension of commercially ground barytes of 325 mesh (per linear inch) without a deflocculating agent, when allowed to settle by gravity produced a cake having a permeability of 9.2 millidarcys. However, a similar suspension containing 0.3% of sodium hexametaphosphate calculated on the barytes, when allowed to settle by gravity in precisely the same manner as the preceding, produced a cake having a permeability of 0.51 millidarcys. This represents a decrease of about eighteen-fold in the permeability. It is believed that the explanation of the effect observed is, that the finer particles were freed from their adhesion to the larger particles, so that they were able to chink up the voids formed by the larger particles. When no deflocculating agent was used the small particles adhered to the larger particles; in fact, the larger particles themselves formed flocculant and voluminous aggregates, all of which influenced a porous cake.

It may advantageous to pretreat the formation to be compacted and sealed, by a solution in water of the deflocculating agent, in order that any flocculating substance present in the formation may be neutralized. Generally truly colloidal size materials should be avoided, as these will not settle out when deflocculated. Commercially ground pigments and weighting materials are satisfactory as are ordinary clays. However, there exists a class of clays which is fairly completely colloidal without, however, being of the gel-forming clays. These should generally be avoided as such a clay will not settle out.

It will be seen that the invention accomplishes its objects; for in accordance with the process embodying this invention, the formation is not only sealed, but compacted. The suspension can be readily flowed into the desired location, because it is a suspension which has more or less fluid form. When sedimentation finally takes place the particles will not only arrange themselves to secure a seal, but also a compact mass.

Having thus described the invention, what is claimed is:

1. The process of compacting or sealing formations, comprising, introducing into the formation a deflocculated suspension of a comminuted material which is of a particle size and character as to be non-colloidal, non-gelling, non swelling, capable of deflocculation when in a suspension and capable of ready sedimentation when the suspension is at rest and permitting sedimentation of the material.

2. The process of compacting or sealing formations, comprising, introducing into the formation a suspension of a comminuted material which is of a particle size and character as to be non-colloidal, non-gelling, non swelling, capable of deflocculation when in a suspension and capable of ready sedimentation when the suspension is at rest together with a deflocculating agent therefor and permitting sedimentation of the material.

3. The process of compacting or sealing a formation traversed by a well bore, comprising, introducing into the well a deflocculated suspension of a comminuted material which is of a particle size and character as to be non-colloidal, non-gelling, non swelling, capable of deflocculation when in a suspension and capable of ready sedimentation when the suspension is at rest and permitting sedimentation of the material in the well.

4. The process of fixing a member in a formation, comprising, introducing into the formation and around the member, a deflocculated suspension of a comminuted material which is of a particle size and character as to be non-colloidal, non-gelling, non-swelling, capable of deflocculation when in a suspension and capable of a ready sedimentation when the suspension is at rest and permitting sedimentation of the material around the member.

5. The process of sealing a casing in a well bore, comprising, introducing around the casing a deflocculated suspension of a comminuted material which is of a particle size and character as to be non-colloidal, non-gelling, non-swelling, capable of deflocculation when in a suspension and capable of ready sedimentation when the suspension is at rest and permitting sedimentation of the material around the casing.

6. The process of closing a well, comprising, introducing into the well a deflocculated suspension of a material which is of a particle size and character as to be non-colloidal, non-gelling, non-swelling, capable of deflocculation when in a suspension and capable of ready sedimentation when the suspension is at rest and permitting sedimentation of the material in the well.

DELMAR H. LARSEN.